United States Patent  (10) Patent No.: US 8,115,858 B2
Kwon et al.  (45) Date of Patent: Feb. 14, 2012

(54) SYSTEM AND METHOD FOR ACQUIRING MOVING IMAGES

(75) Inventors: Jae-Hyun Kwon, Yongin-si (KR);
Hyun-Chul Song, Seoul (KR);
Won-Hee Cheo, Gyeongju-si (KR);
Seok Lee, Seoul (KR); Kang-Eui Lee,
Yongin-si (KR)

(73) Assignees: Samsung Electronics Co., Ltd.,
Suwon-Si (KR); Samsung Electro-Mechanics Co., Ltd., Suwon (KR)

( * ) Notice: Subject to any disclaimer, the term of this patent is extended or adjusted under 35 U.S.C. 154(b) by 621 days.

(21) Appl. No.: 12/318,749

(22) Filed: Jan. 7, 2009

(65) Prior Publication Data
US 2009/0180022 A1 Jul. 16, 2009

(30) Foreign Application Priority Data

Jan. 16, 2008 (KR) .................. 10-2008-0005072
Jan. 30, 2008 (KR) .................. 10-2008-0009741

(51) Int. Cl.
*G03B 7/00* (2006.01)
*G03B 7/12* (2006.01)
(52) U.S. Cl. ........................ 348/362; 396/215
(58) Field of Classification Search ............ 348/221.1, 348/362; 396/213, 215
See application file for complete search history.

(56) References Cited

U.S. PATENT DOCUMENTS
7,609,320 B2 * 10/2009 Okamura ............... 348/362

FOREIGN PATENT DOCUMENTS
JP  2002-314873  10/2002
JP  2003-319269  11/2003
KR  10-2005-0084580  8/2005
KR  10-2007-0064838  6/2007

* cited by examiner

*Primary Examiner* — W. B. Perkey
*Assistant Examiner* — Minh Phan
(74) *Attorney, Agent, or Firm* — Staas & Halsey LLP

(57) ABSTRACT

A system and a method for acquiring a moving image are provided. The system includes an image capturing unit capturing two images having different exposure times at a predetermined time slot, an image storing unit storing at least one of two images which were captured at a time slot previous to the predetermined time slot and which have different exposure times, an output image generating unit generating an output image by synthesizing the two images captured at the predetermined time slot or by synthesizing any one of the two images captured at the predetermined time slot and any one of the two images captured and stored at the previous time slot, an exposure time calculating unit receiving the images captured at the predetermined time slot and setting exposure times for a next time slot, and an exposure time storing unit storing the exposure times for the next time slot.

16 Claims, 7 Drawing Sheets

SYSTEM AND METHOD FOR ACQUIRING MOVING IMAGES

CROSS-REFERENCE TO RELATED APPLICATIONS

This application claims priority from Korean Patent Application No. 10-2008-0005072 filed on Jan. 16, 2008 and Korean Patent Application No. 10-2008-0009741 filed on Jan. 30, 2008 in the Korean Intellectual Property Office, the disclosure of which is incorporated herein by reference in its entirety.

BACKGROUND

1. Field

One or more embodiments of the present invention relate to a system and method for acquiring moving images, and more particularly, to a system and method for capturing a plurality of images having different exposure times, synthesizing the captured images, and acquiring moving images with a wider dynamic range than that of an image pickup device, the system and method capable of adaptively changing exposure times to actively respond to scene changes.

2. Description of the Related Art

Conventional image sensors are not capable of achieving a wide dynamic range. When an image, therefore, is captured in a natural environment using a conventional image sensor, the conventional image sensor may be saturated (an excessively bright image), or a weak signal (an excessively dark image) may be obtained. Consequently, a user may not be able to acquire the desired image. This problem may become worse when a high-contrast image is captured, that is, when an image is captured against a background light. Thus, details of the captured high-contrast image may be severely damaged.

Much research has been conducted to overcome such limitations of conventional image sensors. For example, a technique for improving an image sensor and a technique for processing a captured image to increase the dynamic range thereof have been suggested.

In particular, a technique for processing a captured image to increase the dynamic range thereof has been intensively researched since it can be implemented using software and without modifying a conventional image sensor. However, it is difficult to use this technique when capturing a moving image with rapid scene changes. Thus, a system and method that can capture and process a moving image with rapid scene changes is required.

SUMMARY

One or more embodiments of the present invention provide a system and method for acquiring a moving image in which exposure times are adaptively applied in order to provide a high dynamic range (HDR) moving image with rapid scene changes.

Additional aspects and/or advantages will be set forth in part in the description which follows and, in part, will be apparent from the description, or may be learned by practice of the invention.

According to an aspect of the present invention, there is provided a system for capturing a plurality of images having different exposure times at each time slot and generating an HDR moving image. The system includes: an image capturing unit capturing two images having different exposure times at a predetermined time slot; an image storing unit storing at least one of two images which were captured at a time slot previous to the predetermined time slot and which have different exposure times; an output image generating unit generating an output image by synthesizing the two images captured at the predetermined time slot or by synthesizing any one of the two images captured at the predetermined time slot and any one of the two images captured and stored at the previous time slot; an exposure time calculating unit receiving the images captured at the predetermined time slot and setting exposure times for a next time slot; and an exposure time storing unit storing the exposure times for the next time slot.

The exposure times may include user exposure times input by a user or device exposure times set by the exposure time calculating unit. The user exposure times may include a first user exposure time and a second user exposure time which are different in length, and the device exposure times may include a first device exposure time and a second exposure time which are different in length. The captured images may include a first image corresponding to the first user exposure time or the first device exposure time and a second image corresponding to the second user exposure time or the second device exposure time.

The image storing unit may store the second image captured at the previous time slot.

The output image generating unit may include: a first motion estimator receiving the first and second images captured at the predetermined time slot and performing motion estimation to generate a first estimated image; a second motion estimator receiving the first image captured at the predetermined time slot and the second image captured and stored at the previous time slot and performing motion estimation to generate a second estimated image; and an image synthesizer generating an output image by synthesizing the first estimated image with any one of the first and second images captured at the predetermined time slot or by synthesizing the second estimated image with any one of the first image captured at the predetermined time slot and the second image captured and stored at the previous time slot.

The first motion estimator and the second motion estimator may perform probability-based motion estimation, and the image synthesizer may perform luminance-based image synthesis.

The exposure time calculating unit may include: an image information generator receiving the first and second images captured at the predetermined time slot and generating image information of the first and second images; and an exposure time setter receiving the generated image information and setting the exposure times for the next time slot.

The exposure time setter may perform block-based exposure time setting. The exposure time setter may be applied to an image pickup apparatus.

According to another aspect of the present invention, there is provided a method of capturing a plurality of images having different exposure times at each time slot and generating an HDR moving image. The method may include: capturing two images having different exposure times at a predetermined time slot; storing at least one of two images which were captured at a time slot previous to the predetermined time slot and which have different exposure times; generating an output image by synthesizing the two images captured at the predetermined time slot or by synthesizing any one of the two images captured at the predetermined time slot and any one of the two images captured and stored at the previous time slot; receiving the images captured at the predetermined time slot and setting exposure times for a next time slot; and storing the exposure times for the next time slot.

The exposure times may include user exposure times input by a user or device exposure times set by the exposure time calculating unit. The user exposure times may include a first user exposure time and a second user exposure time which are different in length, and the device exposure times may include a first device exposure time and a second exposure time which are different in length. The captured images may include a first image corresponding to the first user exposure time or the first device exposure time and a second image corresponding to the second user exposure time or the second device exposure time.

The storing of the at least one of the two images may include storing the second image captured at the previous time slot.

The generating of the output image may include: receiving the first and second images captured at the predetermined time slot and performing motion estimation to generate a first estimated image; receiving the first image captured at the predetermined time slot and the second image captured and stored at the previous time slot and performing motion estimation to generate a second estimated image; and generating an output image by synthesizing the first estimated image with any one of the first and second images captured at the predetermined time slot or by synthesizing the second estimated image with any one of the first image captured at the predetermined time slot and the second image captured and stored at the previous time slot.

Probability-based motion estimation may be performed in the performing of the motion estimation first motion, and luminance-based image synthesis may be performed in the synthesizing of the images.

The calculating of the exposure times may include: receiving the first and second images captured at the predetermined time slot and generating image information of the first and second images; and receiving the generated image information and setting the exposure times for the next time slot.

Block-based exposure time setting may be performed in the setting of the exposure times.

The method may be recorded on a medium which can execute the method on a computer.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION OF EMBODIMENTS

Figure 1A:
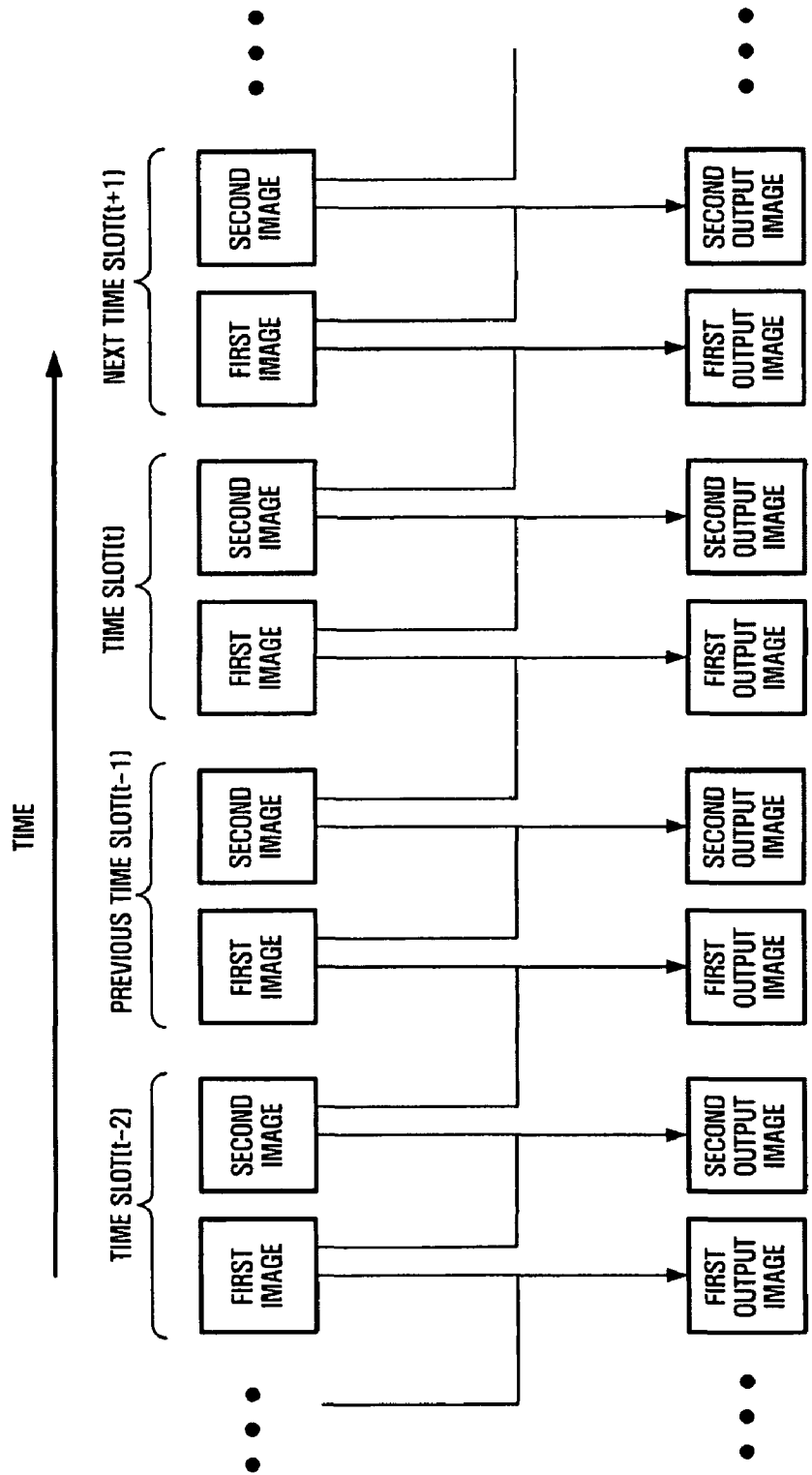
FIG. 1A is a schematic diagram for explaining the operation of a system for acquiring a moving image, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

Embodiments of the present invention will be described hereinafter with reference to block diagrams or flowchart illustrations. It will be understood that each block of the flowchart illustrations, and combinations of blocks in the flowchart illustrations, can be implemented using computer program instructions. These computer program instructions may be provided to a processor of a general purpose computer, special purpose computer, or other programmable data processing apparatus, such that the instructions, which execute via the processor of the computer or other programmable data processing apparatus, implement the functions specified in the flowchart block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

A method of acquiring a moving image, according to an embodiment of the present invention may be implemented by a system 100 (see FIG. 1B) for acquiring a moving image, according to an embodiment of the present invention. Alternatively, the method of acquiring a moving image, according to an embodiment of the present invention, may equally be performed by other systems or devices not described herein.

FIG. 1A is a schematic diagram explaining a process in which a system 100 (see FIG. 1B), according to an embodiment of the present invention, captures frames of a moving image. In general, capturing a moving image refers to capturing successive images as successive frames with respect to time. For example, when twenty frames are captured per second, twenty images are generally captured per second. Thus, a period of time during which the twenty images are captured may be divided into a plurality of discontinuous time slots (e.g., . . . , t−1, t, t+1, t+2, . . . ).

Referring to FIG. 1A, the system 100 (see FIG. 1B), according to an embodiment of the present invention, captures first and second images, which are two different images, at each time slot. Although the first and second images are captured at the same time slot, they are captured sequentially and not simultaneously. The system 100 may capture a plurality of images having different exposure times at each time slot, process the captured images, and acquire a moving image which is a group of images that can be arranged as successive frames. For example, if a second is divided into 30 time slots, the system 100 may capture a total of 60 images by capturing two images having different exposure times at each time slot. Here, each time slot may have equal or unequal duration, and a time slot at which certain images are captured may be set as a predetermined time slot.

The system 100, according to an embodiment of the present invention, may synthesize first and second images captured at a predetermined time slot t into an output image and synthesize the first image captured at the predetermined time slot t and another second image captured at a time slot (t−1), previous to the predetermined time slot t, into another output image. The system 100 may repeat such a process to acquire a high dynamic range (HDR) moving image.

Figure 1B:
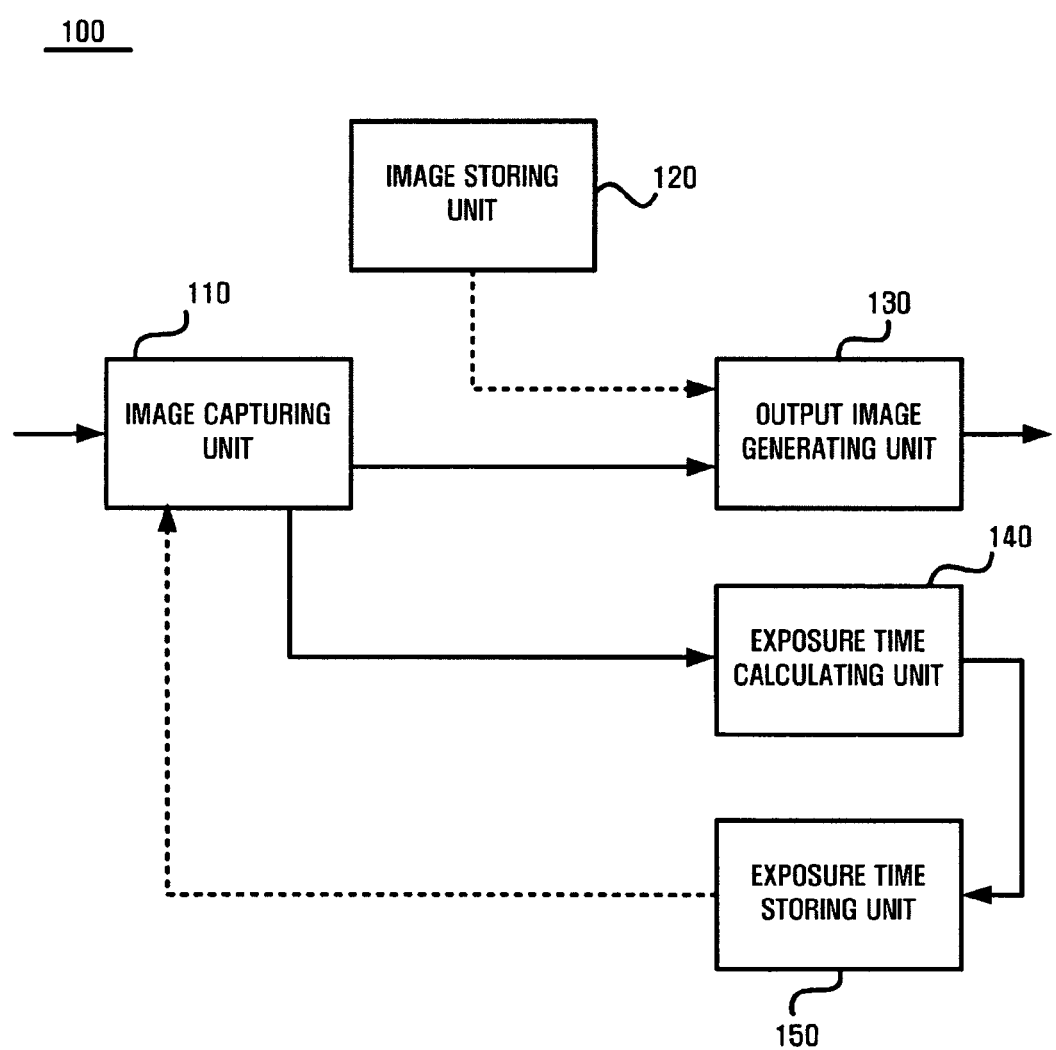
FIG. 1B is a block diagram of the system for acquiring a moving image, according to an embodiment of the present invention.

FIG. 1B is a block diagram of the system 100 for acquiring a moving image, according to an embodiment of the present invention.

Referring to FIG. 1, the system 100 includes an image capturing unit 110, an image storing unit 120, an output image generating unit 130, an exposure time calculating unit 140, and an exposure time storing unit 150.

The image capturing unit 110 may receive an exposure time and capture an image corresponding to the received exposure time. The image capturing unit 110 may capture a plurality of images having different exposure times at a predetermined time slot. In this case, the exposure times may be user exposure times input by a user or device exposure times set by the exposure time calculating unit 140. The user exposure times may include a first user exposure time and a second user exposure time which are different in length, and the device exposure times may include a first device exposure time and a second exposure time which are different in length.

In addition, the captured images may include a first image corresponding to the first user exposure time or the first device exposure time and a second image corresponding to the second user exposure time or the second device exposure time.

As described above, the image capturing unit 110 may capture first and second images at a predetermined time slot by using different user exposure times set by a user or different device exposure times set by the exposure time calculating unit 140.

The image storing unit 120 may store at least one of a plurality of images that were captured by the image capturing unit 110 at a time slot previous to the predetermined time slot. For example, the image storing unit 120 may store a second image captured by the image capturing unit 1110 at the previous time slot.

The output image generating unit 130 may generate an output image by synthesizing the images captured at the predetermined time slot or synthesizing one of the images captured at the predetermined time slot with one of the images captured at the previous time slot. The specific operation of the output image generating unit 130 will be described in greater detail later with reference to FIG. 2.

The exposure time calculating unit 140 may receive the images captured at the predetermined time slot and set exposure times for a next time slot. The specific operation of the exposure time calculating unit 140 will be described in greater detail later with reference to FIG. 3. The exposure time storing unit 150 may store the set exposure times for the next time slot.

Figure 2:
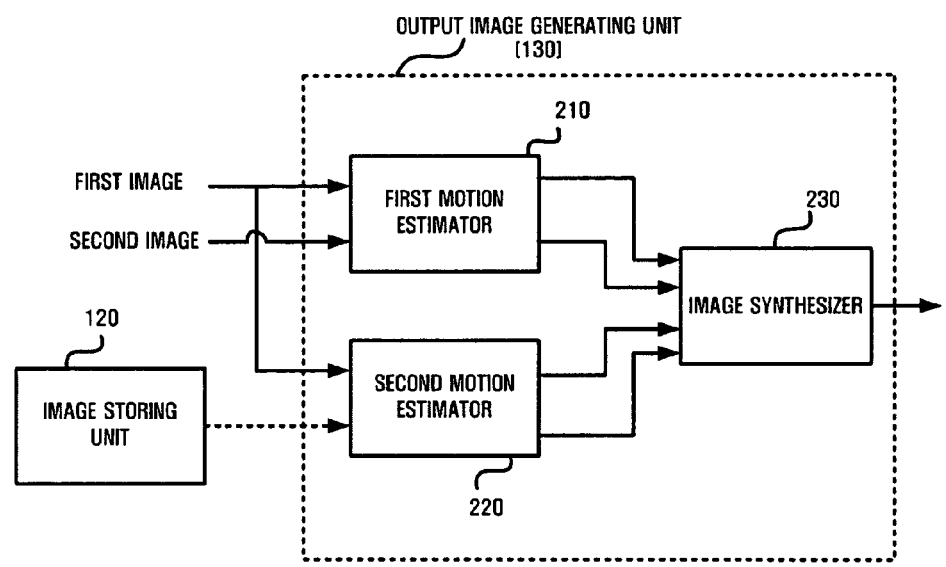
FIG. 2 is a detailed block diagram of an output image generating unit shown in FIG. 1B.

FIG. 2 is a detailed block diagram of the output image generating unit 130 shown in FIG. 1B.

Referring to FIG. 2, the output image generating unit 130 includes a first motion estimator 210, a second motion estimator 220, and an image synthesizer 230.

The first motion estimator 210 receives first and second images, performs motion estimation on one or both of the received first and second images, and generates a first estimated image.

A method of generating the first estimated image, according to an embodiment of the present invention will now be described.

The first motion estimator 210 receives first and second images, which were captured at a predetermined time slot, and performs motion estimation on one or both of the received first or second images. Specifically, the first motion estimator 210 may convert two captured images into images of a single channel. The images of the single channel may be, for example, grayscale images. When red (R), green (G), and blue (B) channels are used, the first motion estimator 210 may convert two captured images into images of a single channel using a value of any one of the R, G and B channels.

Since the first motion estimator 210 converts captured images into images of a single channel, it can perform motion estimation on all kinds of images, such as color images, black-and-white images, infrared images and medical images (e.g., images captured by computerized tomography (CT) scanners or images captured by magnetic resonance imaging (MRI) scanners), irrespective of the mode of an image capturing apparatus.

Next, the first motion estimator 210 generates an image pyramid for each of two captured images or images of a signal channel into which the two captured images have been converted.

In motion estimation, an extensive amount of data must be processed in order to extract a specified motion vector from an original image. Thus, a long data processing time is required. To address this problem, an image pyramid is widely used to reduce an original image and then process the reduced image while properties of the original image are maintained.

Figure 3:
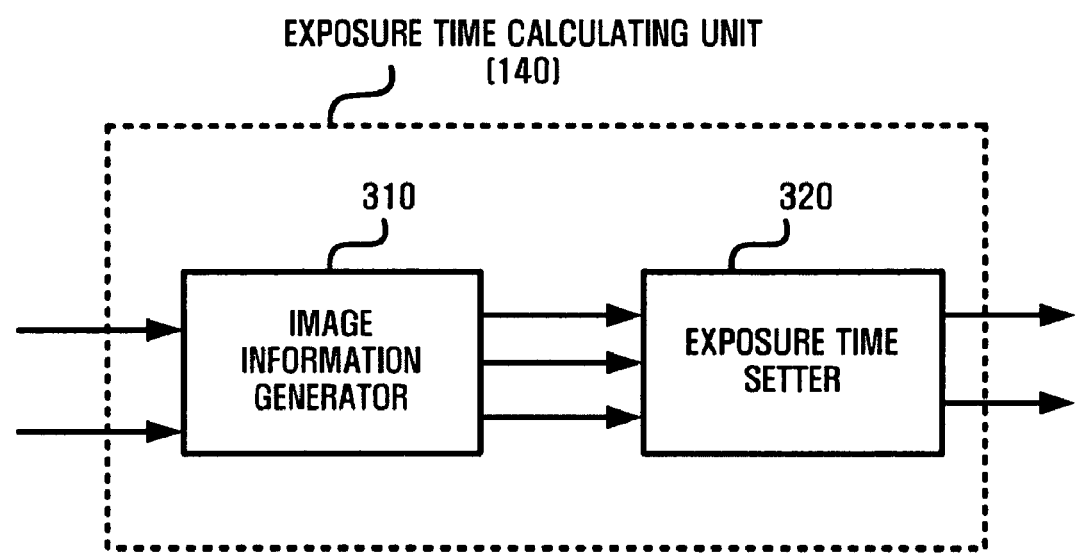
FIG. 3 is a detailed block diagram of an exposure time calculating unit shown in FIG. 1B.

In an image pyramid, the level of an image, which is the same size as an original image, may be level 0, and that of the smallest image may be level n (n=5 in FIG. 3). Thus, a smaller image has a higher level. In addition, as the level of an image is increased, the resolution of the image is reduced and vice versa.

In an embodiment of the present invention, sub-sampling may be performed at each level of an image pyramid in order to generate an image pyramid. In this case, sub-sampling refers to a process of reducing the length and width of an image to a half of its current length and width when generating another image that is one level higher than the image. That is, as the level of an image is increased, the number of pixels included in the image is reduced to a quarter of the current number. Thus, the image is reduced to a quarter of its current size.

In sub-sampling, an image may be split into a plurality of regions, each having 2×2 pixels. Then, a pixel at a specified position in each 2×2 pixel region may be collected to generate another image which is one level higher than the image. Since only one pixel from among pixels in each 2×2 pixel region of the image is used to generate another image which is one level higher than the image, whenever the level of the image is increased, the size of the image is reduced to a quarter of its current size, and its resolution is also reduced. The first motion estimator 210 performs motion estimation by sequentially updating motion vectors from highest to lowest levels of the image pyramid.

Specifically, in the image pyramids of the first and second images, the current level of each of the first and second images is set to the highest level. That is, the first and second images are smallest. Then, the first motion estimator 210 obtains a maximum motion direction between the first and second images at the highest level from directions of (−1, 0), (1, 0), (0, 0), (0, −1) and (0, 1). In order to obtain a maximum motion direction, objective functions for calculating motion vectors are set in five motion directions. Then, an objective function, which has the highest value from among the objective functions for the five motion directions, is found, and a motion direction in which the objective function having the highest value exists is determined as a maximum motion direction. Thus, a maximum motion direction $v_n$ at level n, which is the highest level, has a value selected from (−1, 0), (1, 0), (0,0), (0, −1), and (0, 1).

Setting objective functions in five motion directions and determining the similarity between images in order to obtain a maximum motion direction may be performed using a conventional luminance-based method or a probability-based method. Examples of the luminance-based method may include correlation, normalized correlation, and sum of absolute differences (SAD) algorithms. In addition, examples of the probability-based method may include mutual information and normalized mutual information algorithms. Since the above algorithms are well known, a detailed description thereof will be omitted in the present specification.

When the probability-based method is used, motion estimation can be performed in a stable manner even when there are large differences between the properties of images. Although a drawback of the probability-based method is the large amount of calculation required, since only five objective functions are needed for each level of an image pyramid, according to the present invention, the amount of calculation required is not large even when the probability-based method is used. Hence, motion estimation can be performed quickly.

After obtaining the maximum motion direction $v_n$ at the highest level, i.e., level n, the first motion estimator 210 calculates a motion vector based on the obtained maximum motion direction $v_n$. Here, the motion vector calculated based on the obtained maximum motion direction $v_n$ at level n is $v_n$.

Then, the current level is set to a pyramid image at level (n−1) which is one level lower than level n, and the first motion estimator 210 updates the first image at level (n−1) based on the motion vector $v_n$ which was calculated at level n. In this case, a motion vector used to update the first image at the current level, i.e., level (n−1), is $2v_n$. This is because the value of a motion vector, which is calculated at a specified level, becomes twice its current value at a level lower than the specified level while an image at the specified level is reduced to a half of its current length and width at the level lower than the specified level.

Next, the first motion estimator 210 obtains a maximum motion direction $v_{n-1}$ at level (n−1) based on the updated first image and the second image of the existing image pyramid at level (n−1). The maximum motion direction $v_{n-1}$ at level (n−1) may be obtained as described above and may have a value selected from (−1, 0), (1, 0), (0,0), (0, −1), and (0, 1).

Based on the maximum motion direction $v_{n-1}$ obtained at level (n−1), the first motion estimator 210 updates the motion vector $2v_n$ to $2v_n+v_{n-1}$. That is, the maximum motion direction $v_{n-1}$ obtained at level (n−1) is added to the motion vector $2v_n$ which was obtained by multiplying the motion vector $v_n$ at level n by two. After the motion vector $2v_n$ is updated to $2v_n+v_{n-1}$, the current level is set to an image pyramid at level (n−2) which is one level lower than level (n−1). Then, the first motion estimator 210 updates the first image at the current level, i.e., level (n−2), based on the motion vector $2v_n+v_{n-1}$ which was calculated at level (n−1). In this case, a motion vector used to update the first image at the current level, i.e., level (n−2), is $2^2v_n+2v_{n-1}$. That is, the first image at level (n−2) is updated using the motion vector $2^2v_n+2v_{n-1}$ which was obtained by multiplying the motion vector $2v_n+v_{n-1}$ at level (n−1) by two.

The contribution of the maximum motion direction $v_n$ obtained at level n, which is two levels higher than the current level, i.e., level (n−2), to image motion at level (n−2) is $2^2$ times greater than that to image motion at level n because the size of an image at level n is $2^2$ times smaller than that at level (n−2). Similarly, the contribution of the maximum motion direction $v_{n-1}$ obtained at level (n−1) to image updating at level (n−2) is two times greater than that to image updating at level (n−1) since the size of an image at level (n−1) is two times smaller than that at level (n−2). Therefore, the motion vector used to update the first image in an image pyramid at level (n−2) is $2^2v_n+2v_{n-1}$.

Again, the first motion estimator 210 obtains a maximum motion direction based on the updated first image and the second image at level (n−2) and updates the motion vector $2^2v_n+2v_{n-1}$. The above process is repeated to the lowest level of the image pyramid.

Then, when the current level is level 1, the updated motion vector is $2^{n-1}v_n+2^{n-2}v_{n-1}+\ldots+v_1$, and, when the current level is level 0, a motion vector used to update the first image is $2^nv_n+2^{n-1}v_{n-1}+\ldots+2v_1$ which is twice the motion vector $2^{n-1}v_n+2^{n-2}v_{n-1}+\ldots+v_1$. Again, a maximum motion direction $v_0$ is obtained based on the updated first image and the second image at level 0, and the motion vector $2^nv_n+2^{n-1}v_{n-1}+\ldots+2v_1$ is updated to $2^nv_n+2^{n-1}v_{n-1}+\ldots+2v_1+v_0$. Since the current level is the lowest level in the image pyramid, the first image at the lowest level, i.e., level 0, is updated based on the finally updated motion vector. That is, the motion vector used to finally update the first image at level 0 is $2^nv_n+2^{n-1}v_{n-1}+\ldots+2v_1+v_0$. Using this motion vector, the first image of the original pyramid image is updated for motion estimation.

As described above, at the highest level of an image pyramid, i.e., level n, a maximum motion direction is obtained between initial original image pyramids. Then, at each lower level, the maximum motion direction is obtained between the first image updated based on a motion vector, which was calculated at a higher level, and the second image of the initial original image pyramid.

The first estimated image may be the first or second image that was captured at the predetermined time slot and updated by motion estimation. Specifically, either of the first and second images captured by the image capturing unit 110 may be motion-compensated by motion estimation and thus updated, and the updated first or second image may be the first estimated image. When the first image is updated by motion compensation, the image synthesizer 230 may synthesize the updated first image with the second image. On the other hand, when the second image is updated, the image synthesis unit 230 may synthesize the first image with the updated second image.

The second motion estimator 220 receives the first image and a stored second image, performs motion estimation on the received the first and stored second image, and generates a second estimated image.

The specific operation of the second motion estimator 220 may be similar to that of the first motion estimator 210.

The second estimated image may be the first image, which was captured by the image capturing unit 110 at the predetermined time slot and motion-compensated by motion estimation, or the second image which was captured at the previous time slot and motion-compensated by motion estimation. For example, when the first image, which was captured by the image capturing unit 110 at the predetermined time, is updated, the image synthesizer 230 may synthesize the updated first image with the second image stored in the image storing unit 120.

The image synthesizer 230 may synthesize an image, which was motion-compensated by motion estimation, with another image. For example, the image synthesizer 230 may synthesize the first estimated image with another image (the first or second image captured at the predetermined time slot) or synthesize the second estimated image with another image (the first image captured at the predetermined time slot or the second image captured at the previous time slot).

While a case in which the image synthesizer 230 synthesizes an estimated image with another image has been described, the image synthesizer 230 may also perform motion estimation on any one of the first and second images captured at the predetermined time slot and synthesize the motion-estimated first or second image with the first or second image. Alternatively, the image synthesizer 230 may perform motion estimation on any one of the first image captured at the predetermined time slot and the second image stored at the previous time slot and synthesize the motion-estimated first or second image with the first or second image.

The specific operation of the image synthesizer 230 will now be described below. First, the image synthesizer 230 may receive the first estimated image and the second estimated image and perform image synthesis based on any one of the first and second estimated images.

For simplicity of description, it will hereinafter be assumed that the image synthesizer 230 performs image synthesis based on the first estimated image.

The image synthesizer 230 may synchronize luminance distribution ranges of images with reference to the luminance distribution of the first estimated image. Here, the first estimated image may be the first or second image which was captured by the image capturing unit 110, motion-compensated by motion estimation, and thus updated. For example, when the first image was updated by motion estimation, the first estimated image may be the updated first image. Thus, the image synthesizer 230 may synchronize the luminance distribution range of the second image with that of the updated first image. In this case, synchronizing luminance distributions refers to adjusting the luminance of each image so that the average luminance of the first estimated image becomes equal to that of another image. Thus, when the first estimated image is the updated first image, the luminance of each pixel in the updated first image or the second image may be adjusted so that the average luminance of the second image becomes equal to that of the updated first image.

Specifically, the image synthesizer 230 detects the luminance distribution of the first estimated image. The luminance distribution of an image may be represented by a histogram, which is a luminance distribution diagram, and may include at least one of a minimum luminance, a maximum luminance and an average luminance of the image.

That is, the image synthesizer 230 scans all pixels included in the first estimated image, detects the minimum luminance and maximum luminance of each pixel, and calculates the average luminance of the first estimated image by dividing the sum of all luminances by the number of pixels included in the first estimated image.

Then, the image synthesizer 230 adjusts the luminance of the first estimated image so that the average luminance of the first estimated image becomes equal to that of another image. That is, the image synthesizer 230 adjusts the luminance of an image so that the average luminance of the image becomes equal to that of the first estimated image. That is, the image synthesizer 230 synchronizes the average luminance of the image with that of the first estimated image.

Next, the image synthesizer 230 synthesizes the first estimated image and the image having the synchronized luminance distribution ranges into a single image by assigning different weights to the first estimated image and the image having the synchronized luminance distribution ranges. In this case, if the first image was updated by motion compensation, the updated first image is the first estimated image, and the second image is another image. Conversely, if the second image was updated by motion compensation, the second image is the first estimated image, and the first image is another image.

A method of synthesizing the first estimated image and another image into a single image is as follows.

The image synthesizer 230 generates a different weight according to exposure time and with reference to the luminances of the first estimated image and another image having synchronized luminance distribution ranges. Here, the image synthesizer 230 may generate a weight using Equation (1) below.

$$W_S(x, y) = \frac{L(x, y)}{2^N - 1}$$

$$w_L(x, y) = \left[ 1 + \left( \frac{(2^N - 1) - S(x, y)}{2^N - 1} + \frac{(2^N - 1) - L(x, y)}{2^N - 1} \right) \cdot \frac{1}{2} \right] \cdot \frac{1}{2}$$

Equation 1

Here, N indicates a luminance bit depth of the first estimated image whose luminance distribution range has been synchronized with that of another image. For example, when N=8, the first estimated image may have a luminance level of 0 to 255. In addition, S(x, y) indicates the luminance of a pixel located at coordinates (x, y) of the first image, and L(x, y) indicates the luminance of a pixel located at coordinates (x, y) of the second image. $W_S(x, y)$ indicates a weight for the pixel located at the coordinates (x, y) of the first image, and $W_L(x, y)$ indicates a weight for the pixel located at the coordinates (x, y) of the second image.

Next, the image synthesizer 230 synthesizes the first estimated image and another image assigned with different weights into a single image. That is, the image synthesizer 230 may synthesize the first estimated image and another image having the synchronized luminance distribution ranges into a single image by assigning different weights, which were generated according to exposure time, to the first estimated image and the image. The image synthesizer 230 according to an embodiment of the present invention may perform image synthesis using Equation (2) below.

$$HDR(x,y) = SET(x,y)W_S(x,y) + LET(x,y)W_L(x,y),$$

Equation 2

Here, HDR(x, y) indicates the luminance of a pixel located at coordinates (x, y) of an HDR image into which the first estimated image and another image having the synchronized luminance distribution range were synthesized. In addition, SET(x, y) indicates the luminance of a pixel located at coordinates (x, y) of the first image whose luminance distribution range has been synchronized, and LET(x,y) indicates the luminance of a pixel located at coordinates (x, y) of the second image whose luminance distribution range has been synchronized.

Since the first estimated image and another image having synchronized luminance distribution ranges are synthesized into an output image, the output image has a higher bit depth than the first estimated image before or after its luminance distribution range is synchronized with that of another image. For example, when the bit level of the first estimated image is N, the bit depth of the output image is N+1.

When an image display apparatus, which can represent a (N+1)-bit depth, is used, the output image can be immediately displayed on the image display apparatus. However, when an image display apparatus, which can represent an N-bit depth, is used, it may perform bit conversion as follows.

First, the image synthesizer 230 may analyze a luminance histogram of the output image in order to reduce the luminance range of the output image, whose bit depth has increased as a result of the synthesis process, to the bit depth of the first estimated image.

Then, the image synthesizer 230 may erase histogram data in a luminance region, which has a low distribution of pixels, extend the remaining data, and reduce the bit depth of the output image based on the analysis result of the luminance histogram of the output image.

FIG. 3 is a detailed block diagram of the exposure time calculating unit 140 shown in FIG. 1B. Referring to FIG. 3, the exposure time calculating unit 140 includes an image information generator 310 and an exposure time setter 320.

The image information generator 310 receives a captured image and generates image information of the captured image. Specifically, the image information generator 310 calculates a minimum luminance, an average luminance and a maximum luminance of the captured image. In this case, the captured image may be more than one image, and the minimum luminance, the average luminance and maximum luminance of the captured image may be calculated based on the means of minimum, average and maximum luminance of a plurality of images.

Next, the image information generator 310 sets a luminance section using the image information. That is, the image information generator 310 sets at least one luminance section with reference to the luminance distribution of the captured image. Then, the image information generator 310 divides an input image, e.g., the captured image, into two or more regions.

The image information generator 310 classifies the regions into luminance sections. Specifically, the image information generator 310 calculates the average luminance of each region. That is, the image information generator 310 may calculate the average luminance of each region by dividing the sum of luminance of pixels included in each region by the number of pixels included therein. However, embodiments of the present invention are not limited thereto.

The image information generator 310 allocates a luminance section, which corresponds to the average luminance of a region, to the region.

A luminance section including a dark section, an average section and a bright section will now be described as an example.

The exposure time setter 320 receives a region allocated with a luminance section and calculates exposure times of the dark section and the bright section with reference to the exposure time of the average section. In this case, the exposure time may include a relatively short exposure time and a relatively long exposure time.

Specifically, the exposure time setter 320 calculates an average luminance value of the average section. Then, the exposure time setter 320 calculates luminance values of the dark section and the bright section and sets a target luminance value. In this case, the target luminance value may be calculated based on the difference between the luminance value of the dark section or the bright section and the luminance value of the average section.

Next, the exposure time setter 320 calculates exposure times, which satisfy the target luminance value, with reference to a pre-stored lookup table. The exposure times may be given by Equation (3) below.

$$SET = ET_{AE} - (LUT_{SET} - LUT_{SET\_AVR})$$

$$LET = ET_{AE} - (LUT_{LET\_AVR} - LUT_{LET}), \quad \text{Equation (3)}$$

Here, SET indicates a short exposure time, LET indicates a long exposure time, and $ET_{AE}$ indicates an automatic exposure time. In addition, $LUT_{SET}$ indicates a short exposure time of the lookup table, $LUT_{LET}$ indicates a long exposure time of the lookup table, $LUT_{SET\_AVR}$ indicates an average short exposure time of the lookup table, and $LUT_{LET\_AVR}$ indicates an average long exposure time of the lookup table.

The exposure times calculated by the exposure time setter 320 are stored in the exposure time storing unit 150.

Figure 4:
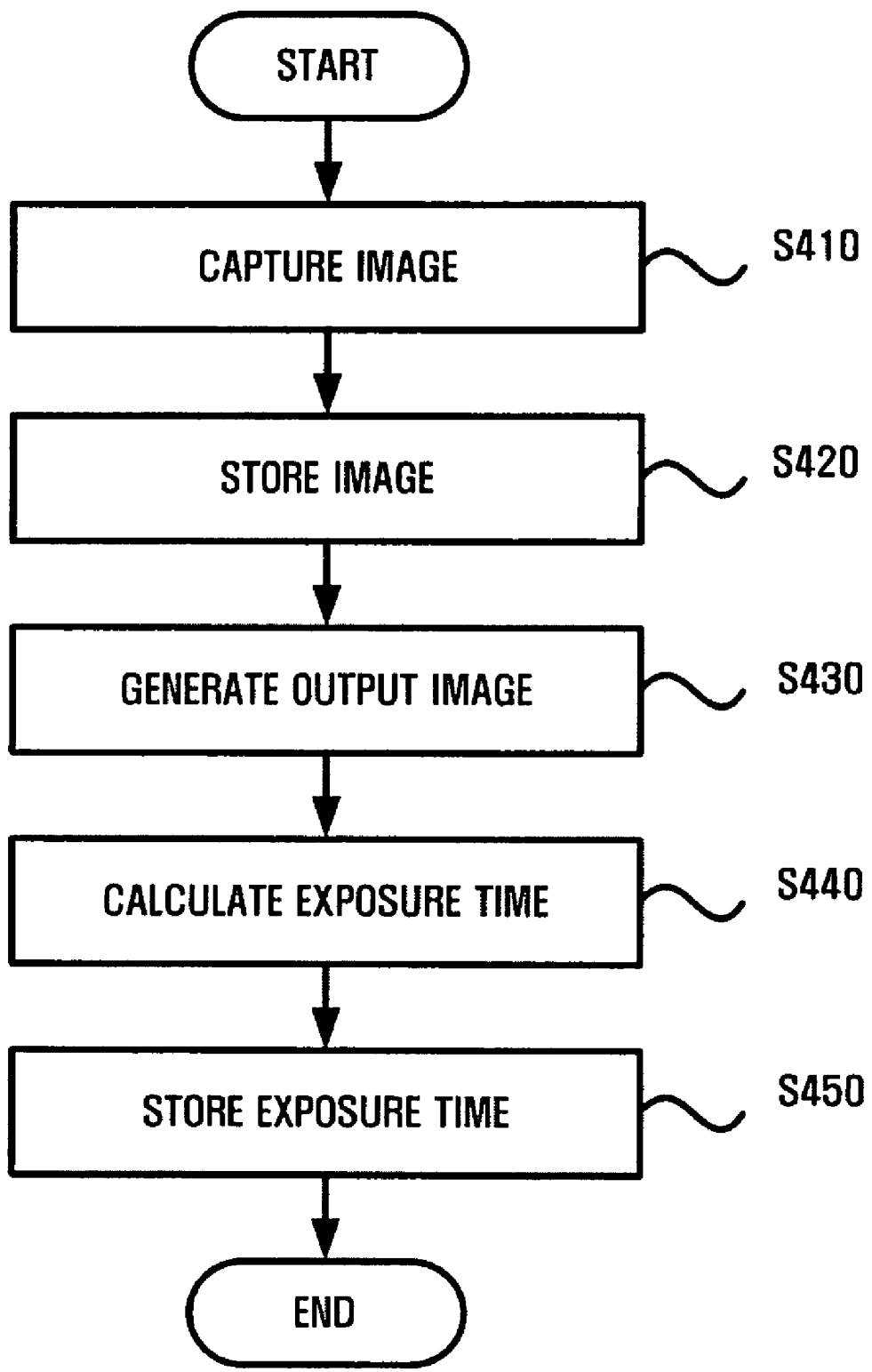
FIG. 4 is a flowchart illustrating a method of acquiring a moving image, according to an embodiment of the present invention.

FIG. 4 is a flowchart illustrating a method of acquiring a moving image, according to an embodiment of the present invention.

Referring to FIG. 4, the method includes capturing two images having different exposure times at a predetermined time slot (operation S410), storing at least one of two images captured at a time slot previous to the predetermined time slot and having different exposure times (operation S420), generating an output image by synthesizing the two images captured at the predetermined time slot or by synthesizing any one of the two images captured at the predetermined time slot and any one of the two images captured and stored at the previous time slot (operation S430), receiving the images captured at the predetermined time slot and setting exposure times for a next time slot (operation S440), and storing the exposure times for the next time slot (operation S450).

Figure 5:
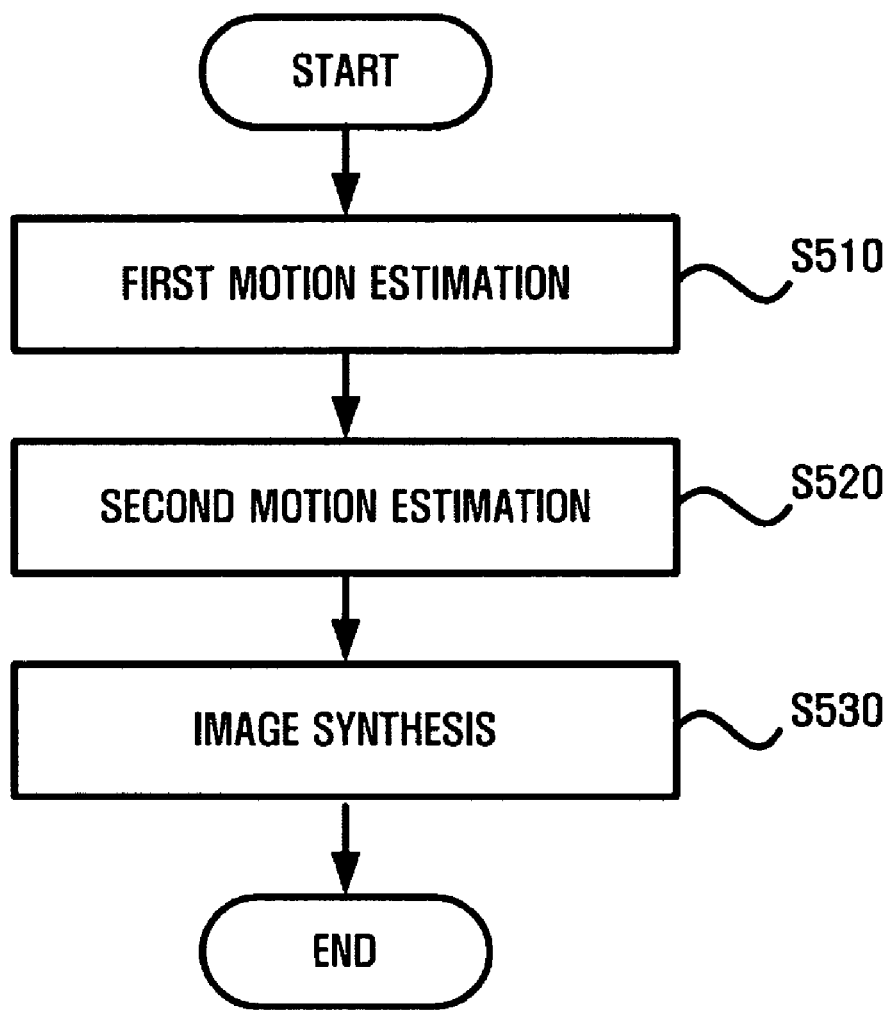
FIG. 5 is a flowchart illustrating operation S430 included in the method of FIG. 4.

FIG. 5 is a detailed flowchart illustrating operation S430 included in the method of FIG. 4.

Referring to FIG. 5, operation S430 may include receiving first and second images captured at the predetermined time slot and performing motion estimation to generate a first estimated image (operation S510), receiving the first image captured at the predetermined time slot and a second image captured and stored at the previous time slot and performing motion estimation to generate a second estimated image (operation S520), and generating an output image by synthesizing the first estimated image with any one of the first and second images captured at the predetermined time slot or by synthesizing the first image captured at the predetermined time slot with the second image captured and stored at the previous time slot (operation S530).

Figure 6:
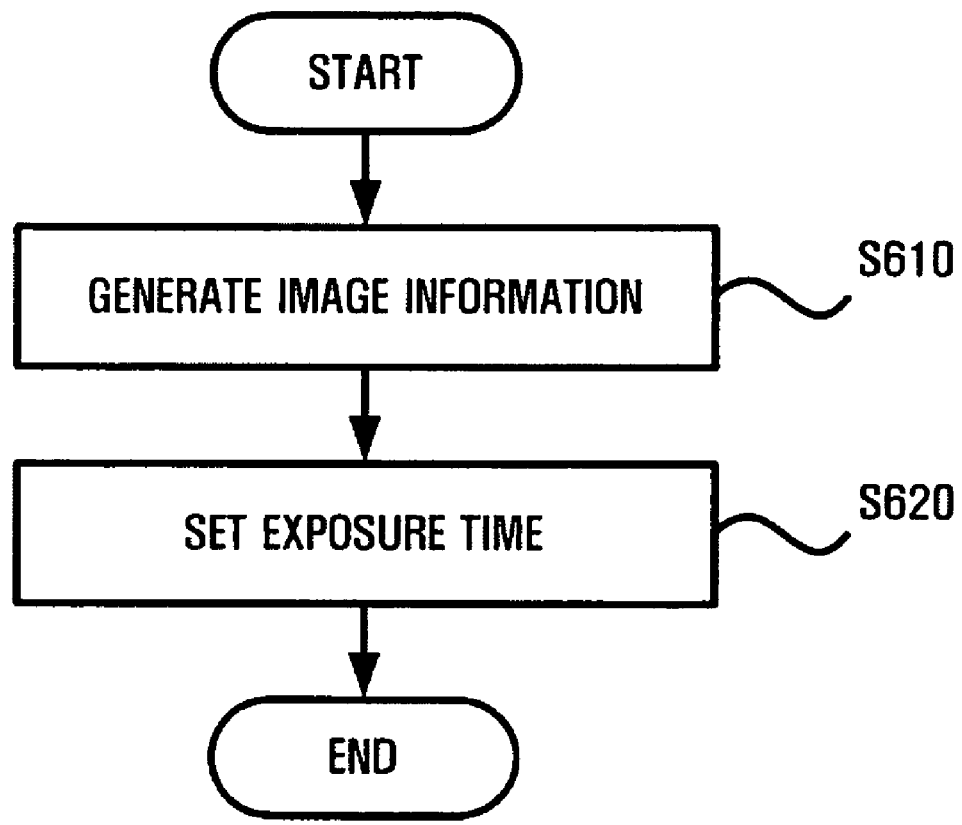
FIG. 6 is a flowchart illustrating operation S440 included in the method of FIG. 4.

FIG. 6 is a detailed flowchart illustrating operation S440 included in the method of FIG. 4.

Referring to FIG. 6, operation S440 may include receiving the first and second images captured at the predetermined time slot and generating image information of the first and second images (operation S610) and receiving the generated image information and setting exposure times for a next time slot (operation S620).

The operation of the system 100 shown in FIG. 1B will now be described in detail with reference to FIGS. 1A through 6. The system 100 may perform two operations.

The first operation of the system 100 is as follows. The image capturing unit 110 of the system 100 may receive exposure times and capture a plurality of images having different exposure times at a predetermined time slot (operation S410). Here, the captured images may include a first image captured using a predetermined exposure time, and a second image captured using an exposure time that is relatively longer than the predetermined exposure time of the first image. The exposure times used initially may be exposure times provided by a user or preset exposure times.

Then, the image storing unit 120 may store at least one of the captured images or at least one of a plurality of images captured at a time slot previous to the predetermined time slot (operation S420).

The output image generating unit 130 may perform first motion estimation using the images captured at the predetermined time slot and synthesize the captured images into an output image (operations S510 and 430).

Then, the exposure time calculating unit 140 may receive the captured images and calculate exposure times for a next time slot by using the captured images (operation S440).

Next, the exposure time storing unit 150 may store the calculated exposure times for the next time slot (operation S450).

The second operation of the system 100 is as follows. First, the image capturing unit 110 may capture a plurality of images having different exposure times at a predetermined time slot (operation S410). In this case, the exposure times may be exposures times which were set for a next time slot and stored in the exposure time storing unit 150.

Then, the image storing unit 120 may store at least one of the captured images or at least one of a plurality of images captured at a time slot previous to the predetermined time slot (operation S420).

The output image generating unit 130 may perform second motion estimation by using any one of the images captured at the predetermined time slot, for example, a first image, and any one of the images captured and stored at the previous time slot, for example, a second image, and may synthesize the images into an output image (operations S520 and S430).

Next, the exposure time calculating unit 140 may receive the captured images and calculate exposure times for a next time slot (operation S440).

Then, the exposure time storing unit 150 may store the exposure times for the next time slot (operation S450).

If the system 100 repeats the first and second operations in an alternating fashion, it can acquire an output image having two frames. Thus, when a moving image having 60 frames per second is to be acquired, the system 100 may repeat the first and second operations 30 times per second.

As described above, since one or more embodiments of the present invention capture a plurality of images using different exposure times and sequentially synthesize the captured images to produce each output image having maximum scene information, an HDR moving image can be acquired.

A system and method for acquiring a moving image according to embodiments of the present invention may include a computer-readable medium. The computer-readable medium stores program commands that are operable in various computers. The computer-readable medium can store program commands, data files, and data structures, or a combination of the same. The program command of the medium is specially designed and configured, or is known to those skilled in the art. The computer-readable recording medium may include a magnetic media (such as a hard disk, a floppy disk, and magnetic tape), an optical media (such as CD-ROM and DVD), a magneto-optical media (such as floptical disk), and also ROM, RAM, and flash memory. Moreover, the computer-readable recording medium may include a hardware device for storing and performing the program commands. The medium may be transmitted over a transmission medium such as light, metal line, and a waveguide pipe including a carrier wave that transmits a signal indicating program commands and data structures. The program commands can be a machine language code by a compiler and a high-level programming language code by an interpreter, which can be executable in the computer.

The system for acquiring a moving image according to embodiments of the present invention can be applied to an image pickup apparatus, which captures images using an image sensor. In this case, the image sensor may include a lens and a solid-state image pickup device. In addition, the image pickup apparatus may include a camera which has a charge coupled device (CCD) image sensor or a complementary metal oxide semiconductor (CMOS) image sensor.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A system for capturing a plurality of images having different exposure times at each time slot and generating a high dynamic range (HDR) moving image, the system comprising:

an image capturing unit capturing two images having different exposure times at a predetermined time slot;

an image storing unit storing at least one of two images which were captured at a time slot previous to the predetermined time slot and which have different exposure times;

an output image generating unit generating an output image by synthesizing the two images captured at the predetermined time slot or by synthesizing any one of the two images captured at the predetermined time slot and any one of the two images captured and stored at the previous time slot;

an exposure time calculating unit receiving the images captured at the predetermined time slot and setting exposure times for a next time slot; and an exposure time storing unit storing the exposure times for the next time slot.

2. The system of claim 1, wherein the exposure times comprise user exposure times input by a user or device exposure times set by the exposure time calculating unit, wherein the user exposure times comprise a first user exposure time and a second user exposure time which are different in length, the device exposure times comprise a first device exposure time and a second device exposure time which are different in length, the captured images comprise a first image corresponding to the first user exposure time or the first device exposure time and a second image corresponding to the second user exposure time or the second device exposure time.

3. The system of claim 2, wherein the image storing unit stores the second image captured at the previous time slot.

4. The system of claim 3, wherein the output image generating unit comprises:

a first motion estimator receiving the first and second images captured at the predetermined time slot and performing motion estimation to generate a first estimated image;

a second motion estimator receiving the first image captured at the predetermined time slot and the second image captured and stored at the previous time slot and performing motion estimation to generate a second estimated image; and an image synthesizer generating an output image by synthesizing the first estimated image with any one of the first and second images captured at the predetermined time slot or by synthesizing the second estimated image with any one of the first image captured at the predetermined time slot and the second image captured and stored at the previous time slot.

5. The system of claim 4, wherein the first motion estimator and the second motion estimator perform probability-based motion estimation, and the image synthesizer performs luminance-based image synthesis.

6. The system of claim 2, wherein the exposure time calculating unit comprises:
    an image information generator receiving the first and second images captured at the predetermined time slot and generating image information of the first and second images; and
    an exposure time setter receiving the generated image information and setting the exposure times for the next time slot.

7. The system of claim 6, wherein the exposure time setter performs block-based exposure time setting.

8. An image pickup apparatus using the system of claim 1.

9. A method of capturing a plurality of images having different exposure times at each time slot and generating an HDR moving image, the method comprising:
    capturing two images having different exposure times at a predetermined time slot;
    storing at least one of two images which were captured at a time slot previous to the predetermined time slot and which have different exposure times;
    generating an output image by synthesizing the two images captured at the predetermined time slot or by synthesizing any one of the two images captured at the predetermined time slot and any one of the two images captured and stored at the previous time slot;
    receiving the images captured at the predetermined time slot and setting exposure times for a next time slot; and
    storing the exposure times for the next time slot.

10. The method of claim 9, wherein the exposure times comprise user exposure times input by a user or device exposure times set by an exposure time calculating unit, wherein the user exposure times comprise a first user exposure time and a second user exposure time which are different in length, the device exposure times comprise a first device exposure time and a second exposure time which are different in length, the captured images comprise a first image corresponding to the first user exposure time or the first device exposure time and a second image corresponding to the second user exposure time or the second device exposure time.

11. The method of claim 10, wherein the storing of the at least one of the two images comprises storing the second image captured at the previous time slot.

12. The method of claim 11, wherein the generating of the output image comprises:
    receiving the first and second images captured at the predetermined time slot and performing motion estimation to generate a first estimated image;
    receiving the first image captured at the predetermined time slot and the second image captured and stored at the previous time slot and performing motion estimation to generate a second estimated image; and
    generating an output image by synthesizing the first estimated image with any one of the first and second images captured at the predetermined time slot or by synthesizing the second estimated image with any one of the first image captured at the predetermined time slot and the second image captured and stored at the previous time slot.

13. The method of claim 12, wherein probability-based motion estimation is performed in the performing of the motion estimation first motion, and luminance-based image synthesis is performed in the synthesizing of the images.

14. The method of claim 10, wherein the calculating of the exposure times comprises:
    receiving the first and second images captured at the predetermined time slot and generating image information of the first and second images; and
    receiving the generated image information and setting the exposure times for the next time slot.

15. The method of claim 14, wherein block-based exposure time setting is performed in the setting of the exposure times.

16. A non-transitory medium recording and executing the method of claim 9 on a computer.

* * * * *